United States Patent [19]
Takata

[11] Patent Number: 5,328,012
[45] Date of Patent: Jul. 12, 1994

[54] ROLLING-CONTACT BEARING TYPE CLUTCH

[76] Inventor: Nobuo Takata, 87, Kurotani 5-chome, Yao-shi, Osaka 581, Japan

[21] Appl. No.: 863,305

[22] PCT Filed: Oct. 16, 1991

[86] PCT No.: PCT/JP91/01409

§ 371 Date: Jun. 26, 1992

§ 102(e) Date: Jun. 26, 1992

[87] PCT Pub. No.: WO92/09820

PCT Pub. Date: Jun. 11, 1992

[30] Foreign Application Priority Data

Nov. 21, 1990 [JP] Japan ................................. 2-316613

[51] Int. Cl.⁵ ............................................. F16D 41/06
[52] U.S. Cl. ........................................ 192/45; 192/65
[58] Field of Search ............................. 192/45, 65, 38

[56] References Cited

U.S. PATENT DOCUMENTS 1,670,197  5/1928  Humfrey ........................... 192/45
1,834,843  12/1931  Humfrey ........................... 192/45
3,557,921  1/1971  Takada ............................ 192/45
3,800,927  4/1974  Takata ............................ 192/45
4,462,490  7/1984  Hattori ......................... 192/45 X
5,035,309  7/1991  Takada ............................ 192/45
5,067,601  11/1991  Castens .......................... 192/45
5,109,964  5/1992  Fukui et al. ................... 192/45 X Primary Examiner—Rodney H. Bonck
Attorney, Agent, or Firm—Jordan and Hamburg

[57] ABSTRACT

A rolling-contact bearing type clutch which comprises an inner ring having an inner raceway surface of a mono-hyperboloid of revolution; an outer ring having an outer raceway surface of a mono-hyperboloid of revolution; rollers disposed in between the inner and outer rings with their center axes slanted, and with the surface of each roller being in line contact with the inner and outer raceway surfaces; and energizing devices energizing either the inner ring or the outer ring in the axis line direction to narrow the gap of the raceways; and annular members provided on the inner and outer rings so as to bring possible axial movements of the rollers to a stop.

2 Claims, 6 Drawing Sheets

ROLLING-CONTACT BEARING TYPE CLUTCH

FIELD OF THE INVENTION

This invention relates to a rolling-contact bearing type clutch which functions as a one-way clutch rotatable only in one direction.

BACKGROUND OF THE INVENTION

One-way clutches have been available in the prior art. A conventional typical one-way clutch is shown in FIG. 8, in which cylindrical rollers 3 are arranged in between the raceway tracks of the inner and outer rings 1 and 2, and the inner raceway surface of the outer ring 2 is formed into saw-like cams to bring the inner and outer rings 1 and 2 into clutch condition in reverse rotation by engaging the cylindrical rollers with the cam surfaces 2c on the outer ring 2. Another traditional one-way clutch is one in which both raceway surfaces of the inner and outer rings are cylindrical, and cam-like sprags are arranged in between the inner and outer rings in place of the cylindrical rollers 3 of the former, to have sprags engaged with the raceway surfaces in reverse rotation by spring force. With the above described clutches according to the prior art, in the reverse rotation (to be placed into clutch condition), the inner and outer rings 1 and 2 are brought into clutch condition by engaging the rollers 3 with the cam-like inner surface portions 2c on the outer ring 2 which are not circular or uneven in the radial direction, while in the normal rotation (free rotation) the rollers 3 are allowed to slide freely between the inner and outer rings 1 and 2. However, since the thrust angle $\alpha$ must be smaller than the friction angle, formation of a cam within the pitch P of the sprag rollers 3 would restrict the cam height, thus causing a possibility of rollers overriding cam portions 2c to damage the clutch.

An even and sufficient clutch force to be desired in the clutches according to the prior art necessitates a condition in which incorporated rollers or sprags respectively are evenly engaged with each corresponding cam surface. A limited dimensional accuracy of the components and a limited uniformity of spring forces to push the rollers in the clutch direction may impose a challenge to the clutches in obtaining uniform clutch forces.

On the other hand, a transmission clutch force to be generated in the clutch operation must have surface pressures between all the surfaces and the corresponding rollers (or sprags) to be in proportion to the required transmission torque and stable within the allowances. For this purpose, however, all the rollers must participate simultaneously in the clutch operation, and wedge forces between all the surfaces and the corresponding rollers to be produced by the clutch operation must uniformly increase or decrease as the required transmission torque will increase or decrease. There may be, however, many limitations for maintaining the allowable surface pressure such as: for original (as manufactured) dimensional accuracy of each component e.g., especially cam shape to be machined; for original (as built) uniformity of relational dimensions between rollers and clutch surfaces to be maintained by bearings; and due to deformations of the inner and outer rings associated with contact pressure between ring contact surface and roller as well as due to their wear. Particularly, this kind of clutch has the basic constraints that in the free rotational operation two separate bearings will freely support the clutch shaft, and the rollers will freely slide on the cam surfaces. The constraints may impose a critical challenge to the wear of the raceway surface and sprag roller in the clutches according to the prior art.

Further, the cams to be formed in the one-way clutches according to the prior art have posed manufacturing difficulties for material and heat treatment for hardness, and machining accuracy for hardened surface. Such critical conditions, when calculating the Herts' stress in the design of allowable surface pressure, forces selection of undesirable values of parameters.

To solve these problems, (Japanese Patent Publication No. 1983-59092 discloses clutches), wherein inner and outer rings are formed like the ones in the conical roller bearing, and rollers or sprags are disposed slantingly to the raceway generatrix between the inner and outer rings. With such configuration, both the rings are freely rotated in one direction (for free rotational operation), while they are clutched in the other reverse direction (for clutch operation).

According to the prior art, however, since the inner and outer rings are formed respectively into a conical surface, the rollers may be brought into line contact with either the inner raceway or the outer raceway, but not with both raceways at the same time, thus causing unstable rotation of roller, resulting in an extremely high surface pressure of the contract portion which fails to be in line contact.

SUMMARY OF THE INVENTION

To solve the above problems, an object of the present inventions is to provide rolling-contact bearing type clutches, which can have free rotation in free rotational operation taking advantage of the feature of the rolling-contact bearing, a large load rating, an increased service life, and a stable operation as clutch even under frequent on-off operation, as well as can eliminate the need for additional supporting bearings.

In addition to the above described objectives, the invention intends to provide a rolling-contact bearing type clutch, which has a further improved capability during the free rotational operation.

In addition to the above described objectives, the invention provides rolling contact bearing type clutches, which can apply to an input/output (I/O) system which permit no axial displacement of the shafts of the I/O systems.

To achieve the above objectives, respective present invention is configured as follows:

Firstly, a rolling-contact bearing type clutch according to the invention comprises an inner rotation body, an outer rotation body, a plurality of intermediate rotation bodies, and energizing means;

the inner rotation body is provided with an inner raceway surface of mono-hyperboloid of revolution about one axis line;

the outer rotation body is provided with an outer raceway surface of mono-hyperboloid of revolution about the above axis line;

the inner and outer raceway surfaces face each other to form a combination of raceways;

the intermediate rotation bodies have a cylindrical rolling surface, being disposed in a circumferential direction of the raceways with their center axes slanting at a predetermined angle to a section including the same axis for the inner and outer rotation bodies, and with the surface of each intermediate rotation body being in line contact with the inner and outer raceway surfaces;

the energizing means energizes either the inner rotation body or the outer rotation body in the axis line direction to narrow the gap of the raceways; and the inner rotation body and the outer rotation body respectively are provided with annular members at far ends of the bodies, which face each other in the axis line, to bring the movement of the intermediate rotation bodies in the axis line direction to a stop.

Secondly, in a rolling-contact bearing type clutch according to the invention, in addition to the above characteristics, the intermediate rotation bodies have a drum-shape symmetrical in the lengthwise direction rather than the cylindrical rolling surface, and their surface is of mono-hyperboloid of revolution about the central axis line.

Thirdly, in a rolling-contact bearing type clutch according to the invention, the intermediate rotation bodies respectively are divided into two or more subassemblies in the central axis direction.

Fourthly, in a rolling-contact bearing type clutch according to the invention, an input/output rotation body is provided to transmit a torque. The input/output rotation body is mounted at one end side of the outer rotation body and at a fixed axial position to the inner rotation body around an end side thereof through a bearing, so as to be freely rotatable relatively to the inner rotation body through the bearing and be engaged with the outer rotation body through the torque transmission means; and the energizing means is provided in between the input/output rotation body and the outer rotation body to energize the outer rotation body in such an axial direction as to narrow the gap of the raceways.

Fifthly, in a rolling-contact bearing type clutch according to the invention.

an input/output rotation body is provided to transmit a torque. The input/output rotation body is mounted at one end side of the inner rotation body and at a fixed axial position to the outer rotation body in an end side thereof through a bearing, so as to be freely rotatable relatively to the outer rotation body through the bearing and be engaged with the inner rotation body through the torque transmission means; and the energizing means is provided in between the input/output rotation body and the inner rotation body to energize the inner rotation body in such an axial direction as to narrow the gap of the raceways.

In the configurations of the present invention, as described above:

The inner and outer raceway surfaces are both formed into mono-hyperboloid of revolution, so that the radius of the track gap formed by the raceway surfaces becomes larger from one side end toward the other. Further, in the track gap the intermediate rotation bodies are placed so as to be slanted to the axis line section.

Therefore, first, if the inner rotation body (inner ring) or the outer rotation body (outer ring) is rotated in the free rotation direction, the intermediate rotation bodies are guided by both raceway surfaces so as to maintain a line contact with the surfaces, while being forced to proceed in one or another axis line direction. But the inner raceway surface and the outer raceway surface respectively forces the intermediate rotation bodies in the different axis line directions opposing to each other, resulting in that the inner ring and the outer ring are pulled apart from each other (or never approach each other) in the axis line through the intermediate rotation bodies.

In this free rotation, the inner ring or the outer ring will rotate so as to proceed the intermediate rotation bodies toward the small track radius on the raceway surface. Therefore, the above pull-apart force will move the inner ring toward the large track radius, while move the outer ring toward the small track radius, so that a force would be always produced between the inner and outer rings so as to widen the track gap.

Further, the energizing means pushes either the inner ring or the outer ring so as to narrow the track gap, the inner and outer rings facing each other in the radial direction never be further pulled apart by the pull-apart force, so that the inner and outer rings would rotate freely from the inermediate rotation bodies, on the balance of the pull-apart force against the energizing force.

Second, if the inner rotation body (inner ring) or the outer rotation body (outer ring) is rotated in the clutch rotation direction, the inner ring or the outer ring will be subject to a force by the energizing means so as to narrow the track gap, as well as the movement of the intermediate rotation bodies in the direction opposing the above will case the inner ring or the outer ring to be moved in the axial direction so as to narrow the track gap, so that the intermediate rotation bodies work as sprags in between the inner and outer rings, thus directly generating clutching action.

As a result, line contacts between the intermediate rotation bodies and corresponding inner and outer raceway surfaces make a uniform pressure (or load) distribution, which generates a good performance of the clutch as rolling-contact bearing during the free (normal) rotation, while a sufficient clutching force by the wedge effect of the rotation bodies during the clutch (reversed) rotation. Then, a self-aligning force will be generated to work on the intermediate rotation bodies, to maintain the uniform load distribution with changing deformation, wear, dimensional accuracy and other conditions of the clutch components.

In this context, the intermediate rotation bodies, make a convex to convex contact with the inner ring and a convex to concave contact with the outer ring, thus causing the intermediate rotation bodies to be guided in the axial direction by the convex to convex contact surface which has smaller contact area or the inner ring surface, generating an undesirable axial movement of the intermediate rotation bodies along the slant.

To prevent the undesirable too far-going axial movement, or deviation of the intermediate rotation bodies out of normal track during the free rotation, ring portions are provided in advance to the inner and outer rings at one ends thereof to bring the movement to a stop.

Further, during the normal reversed clutch rotation, the clutching will never force the intermediate rotation bodies out of track. But, under frequent normal-reversal rotation cycles, too fast cycling may cause the inner ring or the outer ring to be reversely rotated before it advances fully in the axial direction when the intermediate rotation bodies are freely rotating during the normal rotation. At that time, every time the clutch is brought into the clutching rotation, the position of the intermediate rotation bodies may gradually shift far to the axial movement direction in the reversed clutching operation. Therefore, separate ring portions are further provided in advance to the inner and outer rings at their other ends thereof to bring the movement to a stop.

Another embodiment has a plurality of the immediate rotation bodies in the axial direction, which can improve the skewness and reduce rolling resistance.

A further embodiment has, in addition to the components and characteristics discussed above, an input/output rotation body freely rotatable in relation to the inner or outer rotation body at a fixed position thereof in the axial direction. Further, a torque transmission means is provided in between the input/output rotation body and the axially-slidable outer or inner rotation body. Therefore, the input side and the output side of the clutch can be connected without any axial displacement (or maintained to a constant length) even in the coupling operation.

BRIEF DESCRIPTION OF THE DRAWINGS

Now preferable embodiments of the rolling-contact bearing type clutch according to the present invention will be described, referring to the accompanying drawings (FIGS. 1 to 7).

DESCRIPTION OF THE PREFERRED EMBODIMENTS

Figure 1:
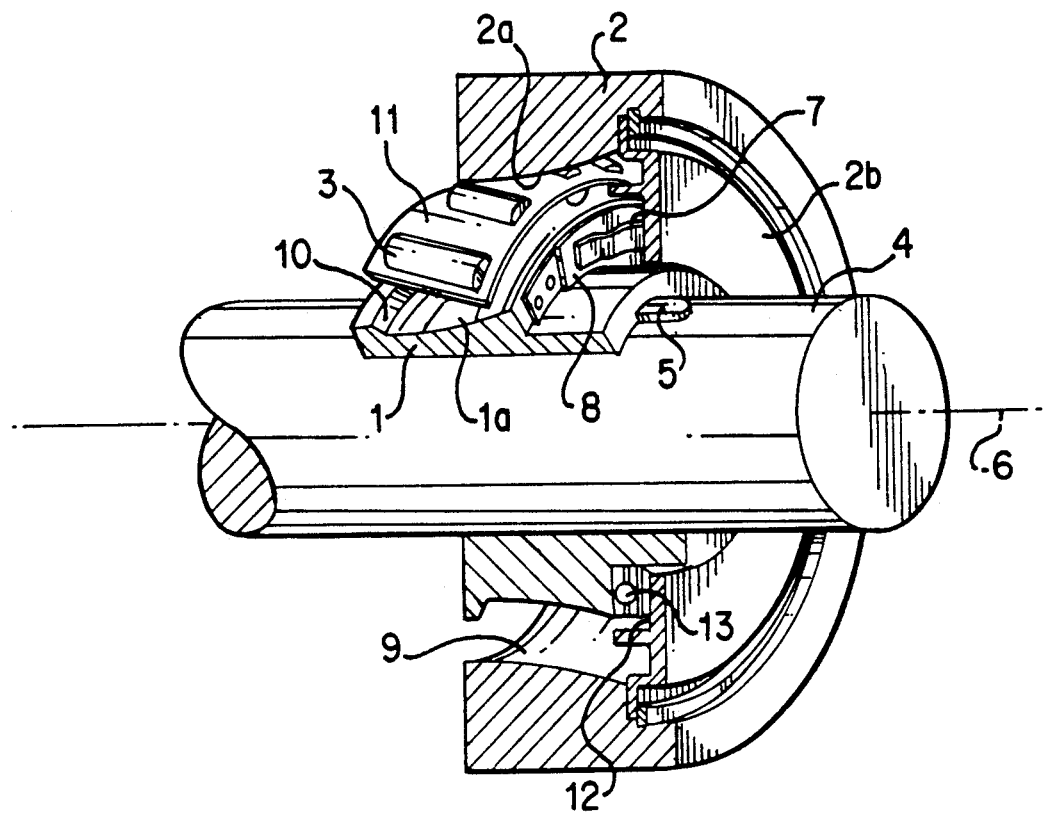
FIG. 1 is a perspective view showing a rolling-contact bearing type clutch according to the present invention.

An inner ring 1 embodying the inner rotation body is slidably mounted on a shaft 4 by a key 5. An outer ring 2 embodying the outer rotation body is disposed facing the inner ring 1 to form a track 9 (a combination of raceways).

Figure 2:
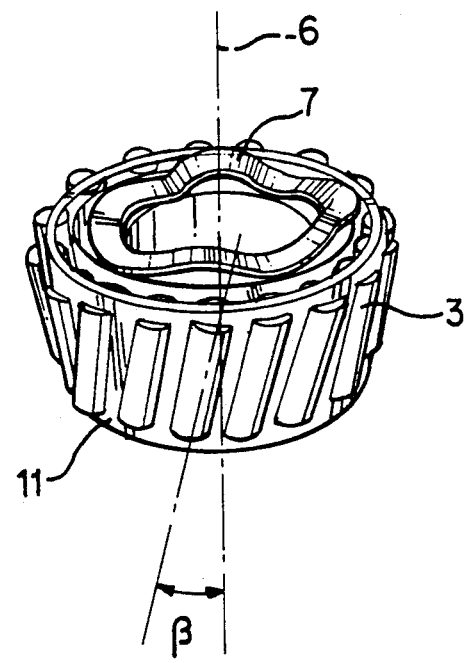
FIG. 2 is a perspective view showing the rollers and their related parts of the embodiment in FIG. 1.

A plurality of rollers 3 embodying the intermediate rotation bodies are, as shown in FIG. 2, disposed in between the raceways 9 slanting to a plane including a central shaft 6 (axis line) of the inner ring 1 at angle of β (e.g., 15 degrees).

The inner ring 1 is pushed by the outer ring 2 via a combination of a plate spring 7, a spring retainer ring 8, and a thrust bearing 13 embodying the energizing means, in a direction to narrow the gap of the raceways 9 (from right to left in the drawing). A flange 10 embodying the ring member is formed on the inner ring 1 at the end opposite the plate spring 7, to bring to a stop the movement of the rollers 3 in the axial direction which tends to widen the gap of the raceways 9.

As configured above, in the free rotation operation (i.e., the shaft 4 and the inner ring 1 is rotating clockwise when viewed from the right end side in the drawing):

The rollers 3 will be rotated counterclockwise guided by the inner ring 1, and be subject to guidance from a raceway surface 2a of the axial position-fixed outer ring 2 so as to advance the inner ring 1 in the right direction against an energizing force of the plate spring, thus enlarging the gap of the raceways 9. In other words, an action similar to that of a tapered screw is provided between the inner and outer rings 1 and 2 via the rollers 3. The action based on the principle of screw advancement will cause the inner ring 1 to be advanced to the right relative to the fixed outer ring 2, so as to enlarge the gap of the raceways 9. As a result, the inner ring 1 can be freely rotated without causing a wedge action of the rollers 3 in between the raceways 9. It should be noted that the flange 10, as one example of the ring member provided to stop the movement of the rollers from one side, is disposed at the end of the inner ring 1 to prevent the rollers 3 from advancing the inner ring 1 too far in the right direction and from disengaging the inner ring 1 in the left direction.

On the other hand, in the reverse (clutch) rotation operation (the shaft 4 is rotated counterclockwise viewing from right), the operations of the components will be reversed as compared to the above description:

The rollers 3 will be rotated clockwise, so as not to advance, but to retreat the inner ring 1 to the left. The compression force of the plate spring 7 will move the inner ring to the left relative to the fixed outer ring 2 so as to narrow the gap of the raceways 9. The action will cause the rollers 3 to be locked in between the raceways 9 to produce a wedge effect. As a result, the inner ring 1 and the outer ring 2 can be clutched as soon as the shaft 4 starts the reversal rotation.

When the shaft 4 is about to be rotated for clutch operation after the shaft 4 has been rotated for a while for free rotation operation, the inner ring 1 starts advancing to the right in the drawing, so as to cause the rollers 3 to be brought into contact with the flange 10, which then guides the rotation of the rollers 3. Therefore, in the reverse rotation, when the rollers 3 advance the inner ring 1 to the left in the drawing so as to narrow the gap of the raceways 9 for clutching, the rollers 3 will never have a chance of advancing on the inner ring 1 so far as to override the inner ring 1 from the right end. However, if frequent cycles of normal and reverse rotations take place, the shaft 4 may be reversed before the rollers 3 come into contact with the flange 10 on the inner ring 1 in normal operations. Therefore, at every starting point of reverse rotation, the position of the rollers 3 relative to the inner ring 1 may gradually shift to the right, thus generating a problem that causes the rollers 3 to override the inner ring 1 to the right. To prevent the problem, i.e., to bring such a movement of the rollers 3 to a stop, a ring 12 as the ring member is also provided on the inner ring 1 at the side opposite the flange 10.

In this connection, the pushing portion 2b inserted in the outer ring 2 at the right end side thereof may be integrally formed in the outer ring 2 itself, or two or more pieces of the identical rolling-contact bearing type clutches may be arranged side by side to make two or more rows.

In the embodiment in FIG. 1, the inner ring 1 is movable (slidable) in the axial direction, but in place of the inner ring 1 the outer ring 2 may be movable.

Further, a thrust bearing to be mounted in place of the spring retainer ring 8 may further enhance free rotation performance.

In FIG. 2, rollers 3 are arranged on the inner ring 1 slanting to a section including the axis 6 thereof by an angle β, and retained in place by a retainer 11 to keep away from each other. This configuration can prevent adjacent rollers 3 rotating in a same direction from running against each other with a relative tangential speed in an opposite direction, resulting in a smooth rotation of each roller 3 about its central axis and a smooth revolution of the rollers 3 around the inner ring 1.

Figure 3:
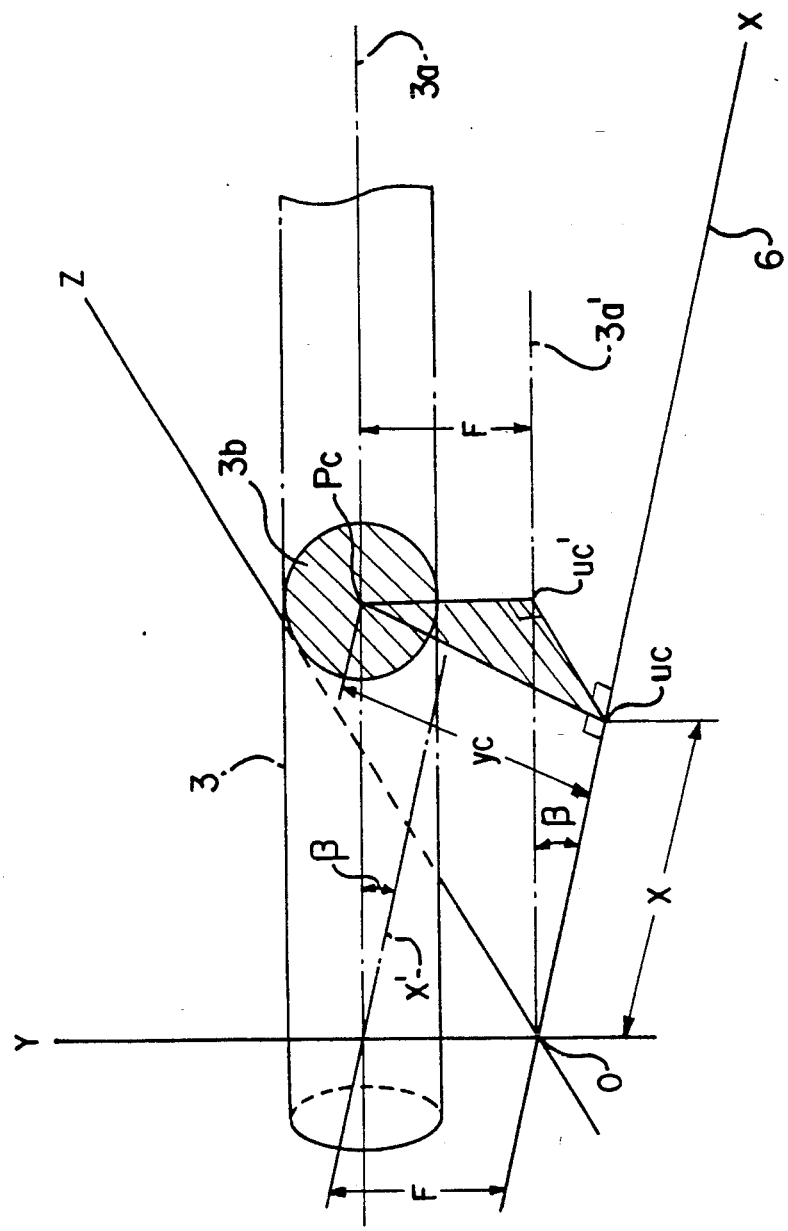
FIGS. 3 to 5 are explanatory drawings to determine the raceway surface shapes.

The the shapes of the inner and outer raceway surfaces 1a and 2a required for a line contact of the rollers 3 with the inner and outer rings 1 and 2 will now be described:

FIG. 3 is a perspective view of X-Y-Z coordinates, in which a roller 3 is so placed that the axis 3a thereof passes through the Y axis a distance F away from the origin O, parallel to the X-Z plane, slanting to the X-Y plane at an angle $\beta$. The X axis represents the common axis 6 of the inner and outer rings 1 and 2. The section 3b of the roller 3 shows one of the roller 3 cut by a plane parallel to the X-Z plane and passing the X axis at an arbitrary position x. Points Uc and U'c are respectively intersections with the X axis and the X-Z plane of the perpendiculars drawn from the center Pc of the cross section to the X axis and the X-Z plane. The line 3a' passing through the origin 0 and the point U'c is a projected line of the roller axis 3a to the X-Z plane, forming an angle with the X axis. Apparently referring to FIG. 3, $$\overline{UcU'c} = x\tan\beta, \overline{PcU'c} = F$$

Therefore, designating, as yc, a distance $\overline{PcUc}$ from the rotation axis 6 of the rings (i.e., X axis) to the center of the roller 3, $$yc^2 = F^2 + (x\tan\beta)^2 \text{ Accordingly,}$$

$$yc^2/F^2 - x^2/(F/\tan\beta)^2 = 1 \quad (1)$$

Since equation (1) represents a hyperbola, the axis line of the roller 3, that is, the center line of the track formed by the inner and outer rings 1 and 2 is hyperbolic with respect to the rotation axis 6 of the rings.

Figure 4:
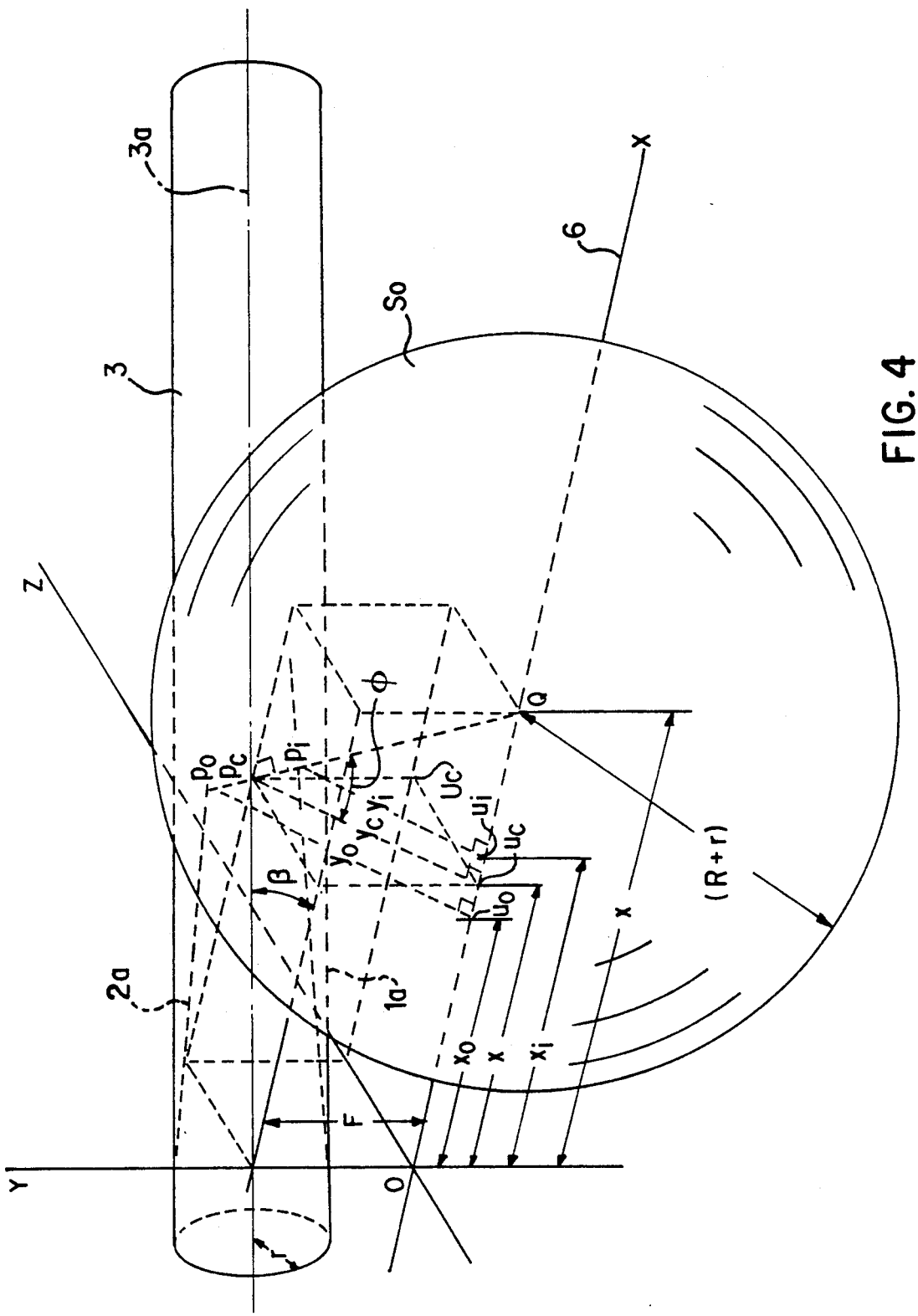

FIG. 4 is a drawing explaining how the rings 1 and 2 respectively come into contact with the roller 3 arranged as above.

Designate as Q an intersection of the X axis with a plane which passes through the center Pc of the roller 3 at right angle with the axis 3a of the roller 3. Consider spheres Si and So (So in FIG. 4) both having the same center Q, which are respectively inscribed and circumscribed to the roller 3. Then, contact points Pi and Po of the roller 3 with the spheres Si and So would be on a perpendicular $\overline{QPc}$, respectively radius r of the roller 3 apart from point Pc. Therefore, designating $\overline{QPc}$ as R, the radii of the spheres Si and So are respectively $(R-r)$ and $(R+r)$.

Designate as Ui and Uo the intersections of planes passing through the points Pi and Po and parallel to the Y-Z plane with the X axis (see FIG. 5). the, $\overline{PiUi}$ and $\overline{PoUo}$ are respectively distances from the points Pi and Po to the X axis, and distances $\overline{OUi}$ and $\overline{OUo}$ from the origin O are respectively the X axis coordinates of the points Pi and Po. Therefore, designating $\overline{OUi}$, $\overline{OUo}$, $\overline{PiUi}$ and $\overline{PoUo}$ as xi, xo, yi and yo, functions F (xi, yi) and F (xo, yo) represent the curved surface shape of the raceways 1a and 2a of the inner and outer rings.

Figure 5:
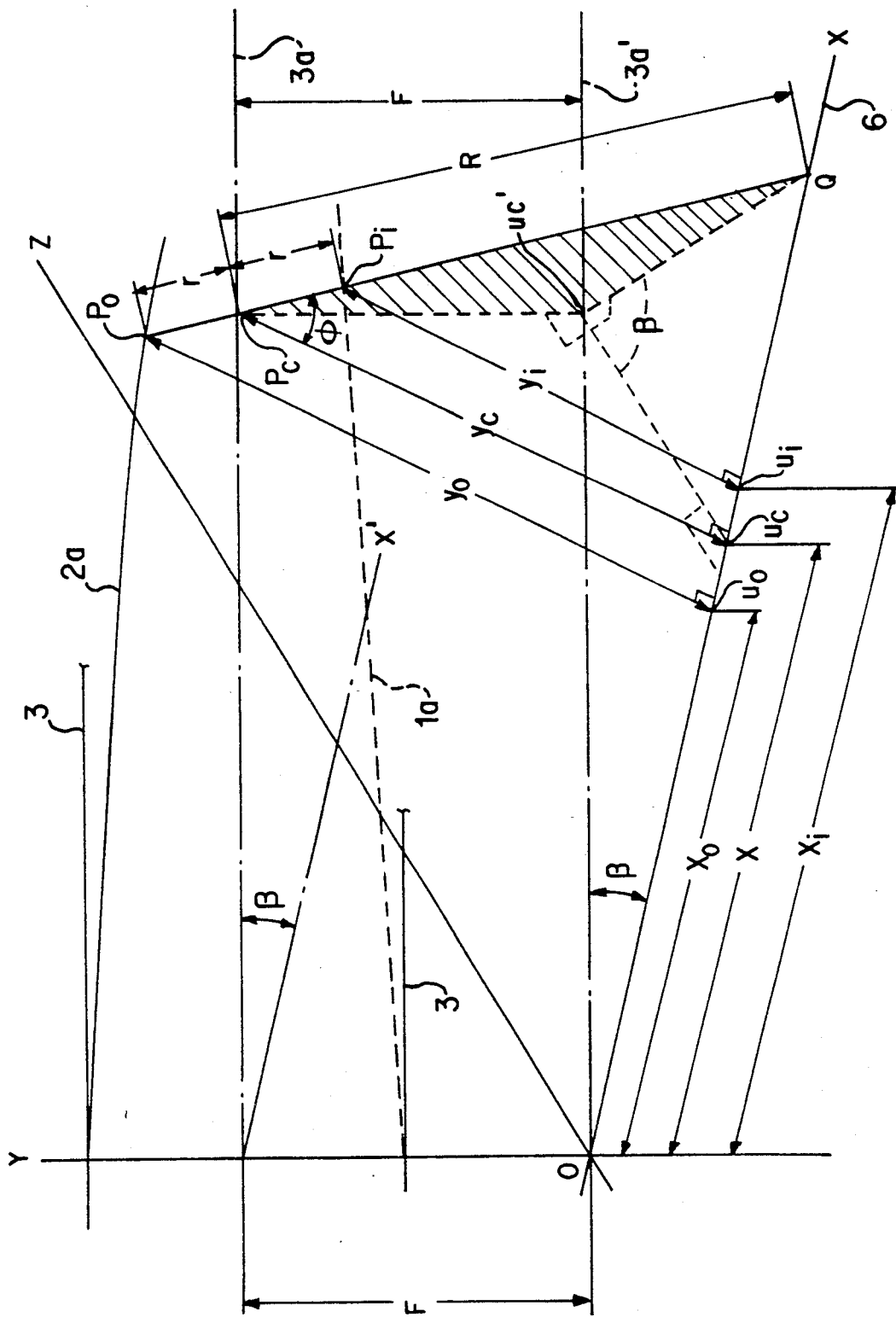

FIG. 5 is an enlarged view showing related portions to determine relational functions.

Since $\overline{QPc}$ (equal to R) is at right angle with the center axis 3a of the roller 3, and the point U'c is an intersection of a perpendicular drawn from the point Pc to the X-Z plane with the plane, $\overline{U'cQ}$ is at right angle with the axis 3a'. Therefore, $$\overline{OQ} = (x/\cos\beta)/\cos\beta = x/\cos^2\beta$$

$$R^2 = F^2 + \{(x/\cos^2\beta)\sin\beta\}^2$$
$$= F^2 + x^2\tan^2\beta/\cos^2\beta$$

Then, designating an angle $<QPcUc$ as $\phi$, since $\Delta QPcUc$ is a right angled triangle, $$\cos\phi = \frac{yc}{R} = \frac{\sqrt{F^2 + x^2\tan^2\beta}}{\sqrt{F^2 + x^2\tan^2\beta/\cos^2\beta}}$$

$$\sin\phi = \frac{\overline{UcQ}}{R} = \frac{x\tan^2\beta}{\sqrt{F^2 + x^2\tan^2\beta/\cos^2\beta}}$$

On the other hand, PcPi and PcPo both equal r, and $\Delta QPiUi$ and $\Delta QPoUo$ are similar to $\Delta QPcUc$, $$xi = x + r\sin\phi = x + xr\frac{\tan^2\beta}{\sqrt{F^2 + x^2\tan^2\beta/\cos^2\beta}} \quad (2)$$

$$xo = x - r\sin\phi = x - xr\frac{\tan^2\beta}{\sqrt{F^2 + x^2\tan^2\beta/\cos^2\beta}} \quad (3)$$

$$yi = yc - r\cos\phi = \quad (4)$$

$$\sqrt{F^2 + x^2\tan^2\beta}\left(1 - \frac{r}{\sqrt{F^2 + x^2\tan^2\beta/\cos^2\beta}}\right)$$

$$yo = yc + r\cos\phi = \quad (5)$$

$$\sqrt{F^2 + x^2\tan^2\beta}\left(1 + \frac{r}{\sqrt{F^2 + x^2\tan^2\beta/\cos^2\beta}}\right)$$

And, from the above equations, F (xi, yi) and F (xo, yo) are introduced as follows:

$$yi = \frac{\sqrt{F^2 + x^2\tan^2\beta}\left(1 - \frac{r}{\sqrt{F^2 + x^2\tan^2\beta/\cos^2\beta}}\right)}{x\left(1 + \frac{r\tan^2\beta}{\sqrt{F^2 + x^2\tan^2\beta/\cos^2\beta}}\right)} xi$$

$$yo = \frac{\sqrt{F^2 + x^2\tan^2\beta}\left(1 + \frac{r}{\sqrt{F^2 + x^2\tan^2\beta/\cos^2\beta}}\right)}{x\left(1 - \frac{r\tan^2\beta}{\sqrt{F^2 + x^2\tan^2\beta/\cos^2\beta}}\right)} xo$$

Theses equations express only that the inner and outer ring raceways 1a and 2a have shapes of a quadratic curved surface. Obtaining ratios of $xi-x/yi-yc$ and $xo-x/yo-yc$, from equations (2) to (5), $$\frac{xi - x}{yi - yc} = \frac{r\sin\phi}{-r\cos\phi} = -\frac{x}{yc}\tan^2\beta$$

$$\frac{xo - x}{yo - yc} = \frac{-r\sin\phi}{r\cos\phi} = -\frac{x}{yc}\tan^2\beta$$

Since the relation of x and yc is hyperbolic from the equation (1), and $\tan^2\beta$ in the above equation is constant, the relation of xi and yi, and xo and yo is hyperbolic. As a result, the inner and outer raceways 1a and 2a are mono-hyperboloids of revolution about the common center axis 6.

For example, assuming $$yi^2/ai^2 - xi^2/bi^2 = 1$$

$$yo^2/ao^2 - xo^2/bo^2 = 1$$

and F=9, r=1.5, β=15 degrees, ai, bi, ao and bo are respectively calculated to be approximately 7.5, 30.1, 10.5 and 37, thus defining the inner and outer raceway surfaces to be monohyperbolic.

Figure 6:
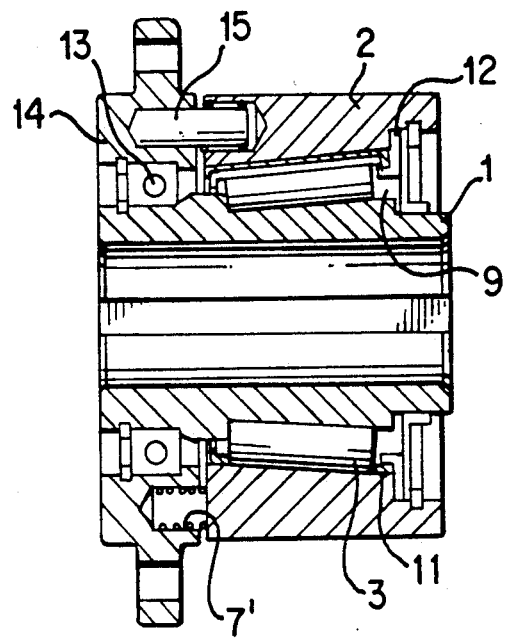
FIGS. 6 and 7 are sectional views of other embodiments of the present invention.
Figure 7:
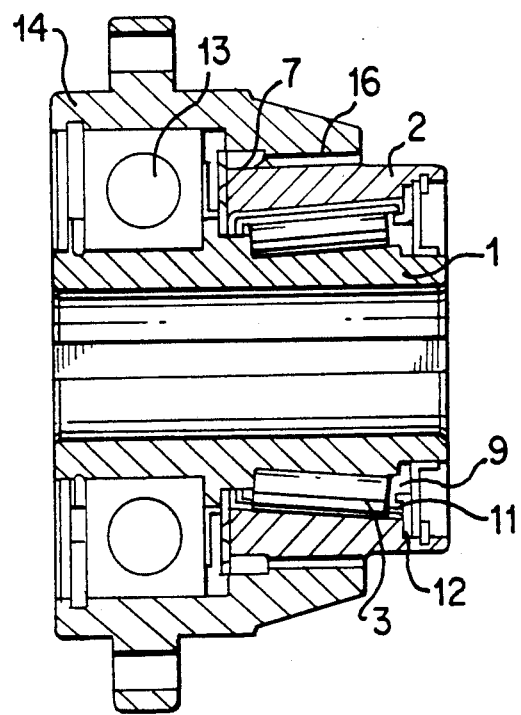
Figure 8:
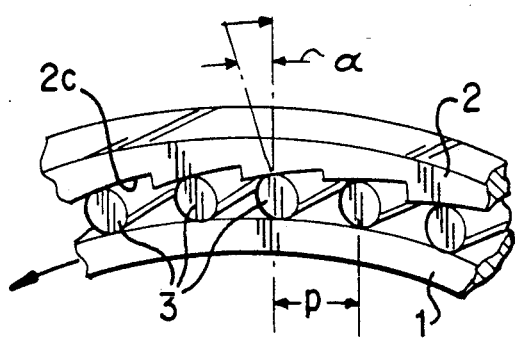
FIG. 8 shows a typical one-way clutch.

FIGS. 6 and 7 are sectional views showing other embodiments of the present invention: Rolling-contact bearing type clutches which use cylindrical rollers and can apply to an input/output (I/O) system whose axial length cannot be changed during the clutch operation, contrary to the previous embodiments.

A gap in between inner ring 1 and outer ring 2 forms a track or raceway 9 for cylindrical rollers 3, and the rollers 3 are retained in the raceway 9 by a retainer 11.

A housing 14 embodying an input/output (I/O) rotation body is provided to transmit a torque. The housing 14 is mounted at one end side of the outer ring 2 and at a fixed axial position relative to the inner ring 1 around an end side thereof through a thrust bearing 13, so as to be freely rotatable relatively to the inner ring 1 through the bearing 13 and be engaged with the outer ring 2 through a torque transmission means consisting of a torque transmission pin (or pins) 15 (FIG. 6) or an involute spline 16 (FIG. 7), or a ball spline (not shown), for an integral rotation with the outer ring 2. A coil spring 7' or a plate spring 7, that is, a pushing spring embodying an energizing means is provided in between the housing 14 and the outer ring 2 to energize the outer ring 2.

Using the above configuration of the embodiment of the rolling-contact bearing type clutch shown in FIGS. 6 or 7, when the inner ring 1 and the housing 14 are respectively used as the input side and the output side or vice versa of the clutch coupling, these clutches according to the invention can be generally used for any I/O system even when no axial displacement of the system is allowed.

FIGS. 6 and 7 show the embodiment in which the housing is in some way or other engaged with the outer ring 2, but the housing or the I/O rotation body may be engaged with the inner ring 1 to transmit the torque of the inner ring 1 (not shown).

As described above, in the rolling-contact bearing type clutches according to the present invention, the rollers 3 are intentionally slanted to the plane including the common axis line 6 of the inner and outer rings 1 and 2, so that during the free rotation operation of the clutch or in the relative free rotation of the inner and outer rings, each of the rollers 3 is rotating about its own axis so as to maintain a stable line contact with the inner and outer raceway surfaces 1a and 2a, while the roller assembly is making a revolution about the common axis of both rings. Therefore, the rollers 3 can obtain an excellent load distribution. In this case, if there should be dimensional errors in rollers 3, or variations in the force previously applied by the plate spring 7 in the start operation, the rollers 3 can change their slant by themselves, so that all the rollers 3 would similarly share the carriage of the load, thus achieving an automatically equalized load distribution. Therefore, the clutches according to the invention with a general machining accuracy can realize a design load distribution, thus obtaining a smooth clutch operation.

Further, in the free rotation operation the rollers 3 serve as a rolling member in a bearing by their rotation and revolution, while in the reverse clutch operation all the rollers 3 serve as a sprag member in a clutch by the action of the energizing means and their self-aligning action. Therefore, if there should occur a deformation of the inner and outer raceway surfaces or a wear of rollers/raceway surfaces, the inner ring 1, the outer ring 2 or rollers 3 may have an axial displacement, but do not affect the clutch operation at all. As a result, the configuration according to the invention can eliminate the need for specially increasing the wall thickness of the inner and outer rings against a possible uneven contact pressure distribution, or for paying a special preventive consideration for possible wear, thereby achieving a light weight and compact clutch assembly.

Further, the rolling-contact bearing type clutches according to the present invention have a circular radial section of the roller assembly like general roller bearings, thereby facilitating the calculation of the allowable surface pressure by using the common equation and parameters used for the general bearings.

As described above in detail, according to the present invention:

One embodiment of the invention takes such inherent advantages of the configuration as an action as rolling-contact bearing in the free rotation operation, and the clutching action and the self-aligning action of rollers in the reverse rotation operation, so that even load distribution can be expected without specially high machining accuracy or under changes of wear or other intrinsic condition and external force or other external conditions, thereby realizing an excellent clutch which has a large load rating, a long service life, and a stable operation due to the smooth free rotation. Further, since the very clutch assembly serves as a bearing, it can eliminate the need for an additional bearing on the shaft. Furthermore, provision of ring members so as to bring to a stop any axial movement of the intermediate rotation bodies can permit repetitive cycles of free rotation and free rotation and free rotaion/reverse clutching operation.

Another embodiment further divides the intermediate rotation body assembly into two or more in the axial direction, thereby enhancing the inherent self-aligning feature, resulting in a further improved performance in the free rotation operation.

A further embodiment of the invention has the additional feature that the I/O rotation member does not displace in the axial direction in relation to the inner rotation body or the outer rotation body which may be the input side or the output side. Therefore, including the case when an I/O system in use does not allow any axial displacement of the clutch assembly or the system itself. This arrangement can be generally adapted as a rolling-contact bearing type clutch.

It will be obvious to these skilled in the art that various modifications may be made in the invention without departing from the spirit and scope thereof and therefore the invention is not limited by that which is shown in the drawings and described in the specification but only as indicated in the appended claims.

What is claimed is:

1. A rolling-contact bearing type clutch comprising an inner rotation body, an outer rotation body, a plurality of intermediate rotation bodies, and energizing means;

said inner rotation body having an inner raceway surface of a mono-hyperboloid of revolution about one axis line;

said outer rotation body having an outer raceway surface of a mono-hyperboloid of revolution about said axis line;

said inner and outer raceway surfaces facing each other to form a combination of raceways;

said intermediate rotation bodies each having a cylindrical rolling surface and being distributed in a circumferential direction of said raceways with their center axes slanting at a predetermined angle to a section including the same axis for said inner and outer rotation bodies, the surface of each intermediate rotation body being in line contact with said inner and outer raceway surfaces;

said energizing means energizing either said inner rotation body or said outer rotation body in the axis line direction to narrow the gap of said raceways;

said inner rotation body and said outer rotation body respectively having annular members at far ends of the bodies, which face each other in said axis line, to bring the movement of said intermediate rotation bodies in said axis line direction to a stop; and a retainer for retaining said intermediate rotation bodies so that they cannot contact one another, said retainer extending axially beyond end faces of said intermediate rotation bodies, said annular members being positioned so that they can contact the end faces of said intermediate rotation bodies.

2. A rolling-contact bearing type clutch as claimed in claim 1, wherein an input/output rotation body for transmitting a torque is mounted at one end of said outer rotation body and at a fixed axial position to said inner rotation body around an end thereof through a bearing, so as to be freely rotatable with respect to said inner rotation body through said bearing and be engaged with said outer rotation body through said input/output rotation body; and said energizing means is provided in between said input/output rotation body and said outer rotation body to energize said outer rotation body in an axial direction to narrow the gap of said raceways.

* * * * *